United States Patent
Wu (10) Patent No.: US 7,843,824 B2
(45) Date of Patent: Nov. 30, 2010

(54) METHOD AND APPARATUS FOR STATISTICALLY MULTIPLEXING SERVICES

(75) Inventor: Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 726 days.

(21) Appl. No.: 11/620,768

(22) Filed: Jan. 8, 2007

(65) Prior Publication Data

US 2008/0165803 A1 Jul. 10, 2008

(51) Int. Cl.
*G01R 31/08* (2006.01)

(52) U.S. Cl. .................... 370/230.1; 370/232

(58) Field of Classification Search .............. 370/265, 370/235, 468, 307, 344, 535–545, 230.1, 370/232–234
See application file for complete search history.

(56) References Cited

U.S. PATENT DOCUMENTS

| | | | | |
|---|---|---|---|---|
| 5,159,447 A | * | 10/1992 | Haskell et al. | 375/240.05 |
| 5,566,208 A | * | 10/1996 | Balakrishnan | 375/240 |
| 5,606,369 A | * | 2/1997 | Keesman et al. | 375/240.01 |
| 5,793,425 A | * | 8/1998 | Balakrishnan | 375/240.25 |
| 5,963,256 A | * | 10/1999 | Tahara | 348/385.1 |
| 6,192,083 B1 | * | 2/2001 | Linzer et al. | 375/240.29 |
| 6,504,850 B1 | * | 1/2003 | Kato et al. | 370/465 |
| 6,731,685 B1 | * | 5/2004 | Liu et al. | 375/240.14 |
| 7,418,007 B1 | * | 8/2008 | Liu et al. | 370/468 |
| 7,450,609 B2 | * | 11/2008 | Liu et al. | 370/468 |
| 2005/0041689 A1 | * | 2/2005 | Wu et al. | 370/477 |

* cited by examiner

*Primary Examiner*—Kwang B Yao
*Assistant Examiner*—Jung Liu
(74) *Attorney, Agent, or Firm*—Larry T. Cullen (57) ABSTRACT

One aspect of the invention relates to statistically multiplexing first services and second services in a group. A measure of required bandwidth for the first services is obtained, where the first services comprise pre-encoded services. An available encoding bandwidth for the second services is determined from a group bandwidth for the first and second services using the measure of required bandwidth. An encoding bit rate is allocated to each of the second services based on the available encoding bandwidth. Each of the second services is encoded in accordance with the encoding bit rate thereof. One or more services of the first services and the second services are transcoded and a multiplex is formed. Since the available encoding bandwidth for the second services is determined using the measure of required bandwidth for the first services, transcoding of the second services is minimized, and video quality is maximized.

15 Claims, 5 Drawing Sheets

METHOD AND APPARATUS FOR STATISTICALLY MULTIPLEXING SERVICES

BACKGROUND OF THE INVENTION

1. Field of the Invention

The present invention relates to video processing and, more particularly, to a method and apparatus for statistically multiplexing services.

2. Description of the Background Art

In digital television systems, such as cable, satellite, and broadcast television systems, transport multiplexers (TMXs) are employed at distribution facilities to process multiple video streams. A TMX typically performs various functions, such as service multiplexing, grooming, video bit-rate transcoding, splicing, and the like. Notably, service multiplexing is the process of combining multiple video streams (also referred to as services) into a single multiplexed stream. Transcoding is the process of partially decoding a video stream, such as an MPEG-2 (moving pictures experts group) elementary stream, followed by a re-encode for the purpose of reducing the video bitrate.

In a distribution facility, some multiplexed services contain a mix of services. Some services in the multiplex are produced by local encoders ("locally encoded services"). Other services in the multiplex are pre-encoded (pre-compressed). The group of services in a multiplex has a particular group bandwidth. In order to multiplex the locally encoded services with the pre-encoded services, the TMX often must adjust the video bit rate of one or more services so that the multiplex fits in the group bandwidth. In current implementations, local encoders are configured to encode services using constant bit rate (CBR) encoding. The TMX then transcodes one or more of the locally encoded services to satisfy the group bandwidth constraint. Such transcoding, however, results in a loss of video quality, particularly when transcoding from a high bit rate to a significantly lower bit rate. Accordingly, there exists a need in the art for a method and apparatus capable of statistically multiplexing locally encoded and pre-encoded services with minimal transcoding of the locally encoded services.

SUMMARY OF THE INVENTION

Method and apparatus for statistically multiplexing services is described. One aspect of the invention relates to statistically multiplexing first services and second services in a group. A measure of required bandwidth for the first services is obtained, where the first services comprise pre-encoded services. An available encoding bandwidth for the second services is determined from a group bandwidth for the first and second services using the measure of required bandwidth. An encoding bit rate is allocated to each of the second services based on the available encoding bandwidth. Each of the second services is encoded in accordance with the encoding bit rate thereof. The first services and the second services as encoded are multiplexed. In one embodiment, one or more services of the first services and the second services are transcoded to form the multiplex. Since the available encoding bandwidth for the second services is determined using the measure of required bandwidth for the first services, transcoding of the second services is minimized, and video quality is maximized.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
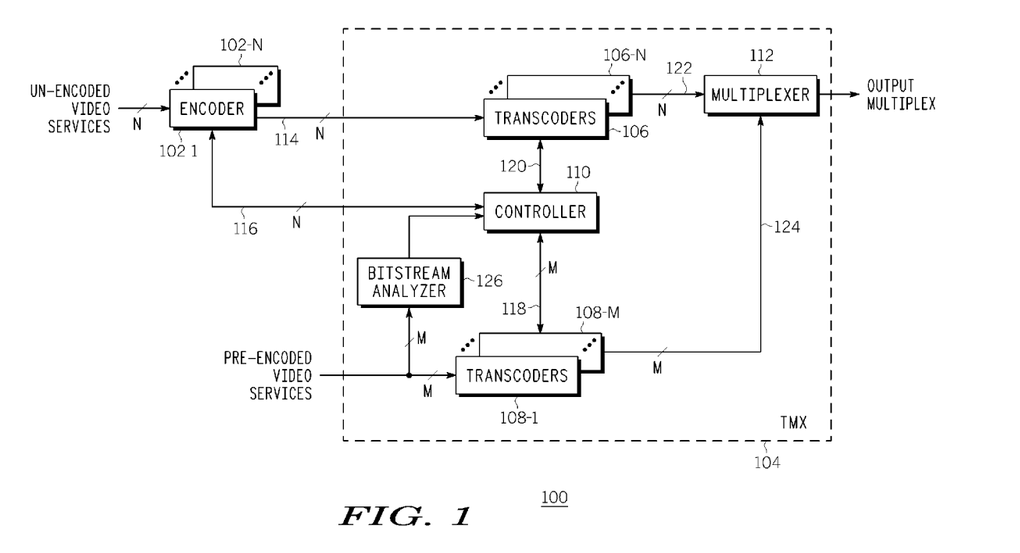
FIG. 1 is a block diagram depicting an exemplary embodiment of a video processing system in accordance with one or more aspects of the invention.

FIG. 1 is a block diagram depicting an exemplary embodiment of a video processing system 100 in accordance with one or more aspects of the invention. The video processing system 100 includes encoders 102-1 through 102-N (collectively referred to as encoders 102) and a transport multiplexer (TMX) 104, where N is an integer greater than zero. The TMX 104 includes transcoders 106-1 through 106-N (collectively referred to as transcoders 106), transcoders 108-1 through 108-M (collectively referred to as transcoders 108), a controller 110, a bitstream analyzer 126, and a multiplexer 112, where M is an integer greater than zero. The video processing system 100 is configured to process un-encoded video services and pre-encoded video services to produce a multiplexed service.

The encoders 102 are configured to receive the un-encoded video services. The un-encoded video services may comprise analog or digital video. Video, as used herein, may optionally include audio and/or associated audio/video presentation control information and/or user data. The encoders 102 are configured to encode the un-encoded video services to produce encoded video services ("locally encoded video services") using a video compression algorithm, such as MPEG-2, MPEG-4, H.264, or like type algorithms/standards known in the art. Each encoded video service has a particular encoding bit-rate. As is well known in the art, the encoding bit-rate determines the amount of quantization employed in the compression algorithm, which affects the quality of the encoded video. In one embodiment, the encoders 102 employ variable bit-rate (VBR) encoding, so the encoding bit-rate of the encoded services changes over time. The encoders 102 transmit the encoded video services to the TMX 104 via links 114. The links 114 may comprise any type of compressed video links, such as an asynchronous serial interface (ASI) links. Each encoded video service has a particular transmission bit rate, which is the rate data is transmitted from an encoder to the TMX 104. The encoders 102 may comprise, for example, SE1010 or SE2000 encoders, commercially available from Motorola, Inc., of Schaumberg, Ill.

The encoders 102 are further coupled to the controller 110 via links 116. The links 116 may comprise a network links, such as a user datagram protocol/internet protocol (UDP/IP) links or the like. The controller 110 periodically generates an interrupt every Tq seconds (e.g., every 0.00085 seconds). At every interrupt, each of the encoders 102 sends an encoding need parameter of the current frame being encoded, a maximum transmission bit rate allowed, and a minimum transmission bit rate required to the controller 110. The "encoding need parameter" is a measure of a compression demand of the encoder, which depends on the complexity and motion of the video being compressed. An exemplary process for determining an encoding need parameter is described in commonly-assigned U.S. Pat. No. 6,731,685, issued 4 May 2004 and incorporated by reference herein. Based on the encoding need parameter and min/max transmission bit rates, the controller 110 determines an encoding bit rate and a transmission bit rate for each of the encoders 102 using a bandwidth allocation algorithm. An exemplary embodiment of the bandwidth allocation algorithm is described below. The controller 110 transmits the encoding and transmission bit rates to the respective encoders 102.

Each of the transcoders 108-1 through 108-M is configured to receive a respective one of M pre-encoded video services. The bitstream analyzer 126 is also configured to receive the pre-encoded video services. The pre-encoded video services may comprise, for example, MPEG-2 video streams. The transcoders 108 are configured to selectively transcode the pre-encoded video streams under supervision of the controller 110. The transcoders 108 are coupled to the controller 110 via links 118. The bitstream analyzer 126 is coupled to the controller 110 via a link 128. The links 118 and 128 may comprise a backplane or midplane bus, such as a peripheral component interconnect (PCI) bus, or network links (e.g., a UDP/IP links). The bitstream analyzer 126 is configured to analyze each of the pre-encoded video services and derive statistics therefrom. At every interrupt, the bitstream analyzer 126 sends statistics of the pre-encoded video service to the controller 110. Exemplary statistics include input bit rate, number of bits on each input frame, video resolution, average quantizer value of each input frame, picture type of each input frame (e.g., intra-coded (I), predictive coded (P), or bi-directional predictive coded (B)). While the bitstream analyzer 126 is shown as a separate component, those skilled in the art will appreciate that the function of the bitstream analyzer 126 may be distributed among the transcoders 108 such that each of the transcoders 108 derives statistics of its input bitstream.

The controller 110 computes a transcoding need parameter from the statistics for each pre-encoded video service, from which the controller 110 determines the instantaneous transcoding bit rate for each pre-encoded video service. An exemplary process for computing transcoding need parameters is described in commonly-assigned U.S. Pat. No. 6,847,656, issued 25 Jan. 2005 and incorporated by reference herein. The instantaneous transcoding bit rates are allocated from the available bandwidth proportional to the computed transcoding need parameters, subject to minimum and maximum bit rate constraints. The controller 110 uses the transcoding bit rates to perform rate control for the transcoders 108. The controller 110 also determines the transmission bit rates at which the transcoders 108 output transcoded services.

The encoding bit-rates of the locally encoded video services are assigned before the transcoding bit-rates of the pre-encoded video services are known. That is, the bandwidth of the encoders 102 is assigned before the bandwidth requirement of the transcoders 108 is known. In order to protect the pre-encoded video services from bit-starving, the locally encoded video services are coupled to the transcoders 106 via the links 114. The transcoders 106 are further coupled to the controller 110 via links 120. The links 120 may comprise a backplane or midplane bus, such as a peripheral component interconnect (PCI) bus, or network links (e.g., UDP/IP links). The transcoders 106 are configured to selectively transcode the locally encoded video services under the supervision of the controller 110. As discussed below, the controller 110 performs a bandwidth allocation algorithm that attempts to minimize transcoding of the locally encoded video services. Thus, one or more of the locally encoded video services may actually "pass-through" the transcoders 106 without being transcoded. The controller 110 may instruct the transcoders 106 to transcode one or more of the locally encoded video services, respectively, to reduce the bit-rate thereof in order to provide bandwidth for the pre-encoded services. The bandwidth allocation algorithm implemented by the controller 110 is described immediately below.

The controller 110 allocates bandwidth among the locally encoded and pre-encoded services at every interrupt. In one embodiment, there are two stages to the bandwidth allocation algorithm: In the first stage, a portion of the group bandwidth (i.e., the bandwidth available for the group of locally encoded and pre-encoded services) is allocated to the locally encoded services. Then after a delay, the bandwidth of the locally encoded services is reduced (by transcoding) if necessary, and the remaining group bandwidth is allocated to the pre-encoded services.

The bandwidth allocation algorithm can be further divided into the following steps. Based on the need parameters and configurations (e.g., weighting, minimum and maximum bit rates) of all video services (locally encoded and pre-encoded), the controller 110 sets aside a portion of the group bandwidth (GBW) to become the available encoding bandwidth (EBW) for the services processed by the encoders 102. The available encoding bandwidth may be computed as follows:

$$EBW = \text{Maximum} \left\{ \text{Minimum} \left\{ GBW \times \frac{ENP}{ENP + f(TNP)}, MAXEBW \right\}, SEMIN \right\}, \quad \text{Eq. 1}$$

where ENP is a sum of weighted encoding need parameters for the locally encoded services, TNP is a sum of weighted transcoding need parameters for the pre-encoded services, MAXEBW is the maximum encoding bandwidth, SEMIN is a sum of minimum bit rates for the locally encoded services, and f is a function for transforming TNP to match ENP. In one embodiment, $f(TNP)=K \times TNP$, where K is an empirical constant. Alternatively, the function f may be a more general piecewise linear function, for example, $f(TNP)=a \times TNP+b$, where a and b vary with the range of TNP. The maximum encoding bandwidth is the group bandwidth less the sum of the minimum bit-rates of the pre-encoded services. A weighted need parameter is the value of the need parameter received by the controller 110 from an encoder or a transcoder multiplied by a weighting factor.

Next, the controller 110 allocates an encoding bit rate to each of the encoders 102. The controller 110 divides the available encoding bandwidth (EBW) among the encoders 102. In one embodiment, each of the encoders 102 receives bandwidth (encoding bit-rate) proportional to its weighted encoding need parameter, subject to the minimum and maximum bit-rate constraints.

Next, the controller 110 delays the available encoding bandwidth (EBW) value by a pre-defined amount. In one embodiment, the available encoding bandwidth is delayed by 0.5 seconds. The delayed available encoding bandwidth (DEBW) is then bounded by the aggregated minimum and maximum transmission bit rates to become the available transmission bandwidth (TBW). The available transmission bandwidth may be computed as follows:

$$TBW = \text{Minimum}\{\text{Maximum}\{DEBW, SMINTXR\}, SMAXTXR, MAXTBW\} \quad \text{Eq. 2}$$

where SMINTXR is the sum of minimum transmission bit rates for the encoders 102, SMAXTXR is the sum of maximum transmission rates of the encoders 102, and MAXTBW is the maximum transmission bandwidth. The maximum transmission bandwidth is equal to the group bandwidth (GBW) less the sum of all minimum bit-rates for pre-encoded services.

Next, the controller 110 allocates a transmission bit-rate to each of the encoders 102. The controller 110 divides the available transmission bandwidth among the encoders 102. In one embodiment, each of the encoders 102 receives bandwidth (transmission bit-rate) proportional to its delayed encoding bit-rate, subject to the maximum and minimum transmission bit rate constraints. An exemplary technique for determining a transmission bit-rate in a statistical multiplexer is described in commonly-assigned International Application WO 02/25951, published 28 Mar. 2002, and incorporated by reference herein.

Next, the controller 110 determines the transcoding bit rate for all video services (the locally encoded services and the pre-encoded services). The locally encoded services are processed by the transcoders 106 in the same manner as the transcoders 108 process the pre-encoded services. Since video quality is degraded by transcoding, the goal of the bandwidth allocation algorithm is to minimize the amount of transcoding on the locally encoded video streams. When the algorithm is optimized, the locally encoded video services should pass through the transcoders 106 most of the time. One or more of the locally encoded video services may occasionally be transcoded to provide bandwidth to maintain the quality of the pre-encoded services.

After a look-ahead delay (e.g., 0.45 seconds), transcoding need parameters are computed for the locally encoded video services and the pre-encoded video services. Note that the transcoding need parameter of a locally encoded service is not the same as the encoding need parameter, although they have similar characteristics. Encoding need parameters are computed from the original input video, whereas the transcoding need parameters are computed from the compressed bitstreams.

In one embodiment, the controller 110 applies rate shaping uniformly across all of the video services (locally encoded and pre-encoded), treating the locally encoded services the same as the pre-encoded services. Since the bit-rates of the locally encoded services are VBR and have already accounted for the bandwidth need of the pre-encoded services, the bit-rate reduction of the locally encoded services is minimized (e.g., transcoding is minimized). Performance of the bandwidth allocation algorithm may be improved by biasing the transcoding bit-rate allocation towards the locally encoded services such that the locally encoded services are passed through the transcoders 106 most of the time.

The transcoders 106 are coupled to the multiplexer 112 via compressed video links 122, and the transcoders 108 are coupled to the multiplexer 112 via compressed video links 124. The multiplexer 112 multiplexes the locally encoded video services and the pre-encoded video services to produce the output multiplex.

Figure 2:
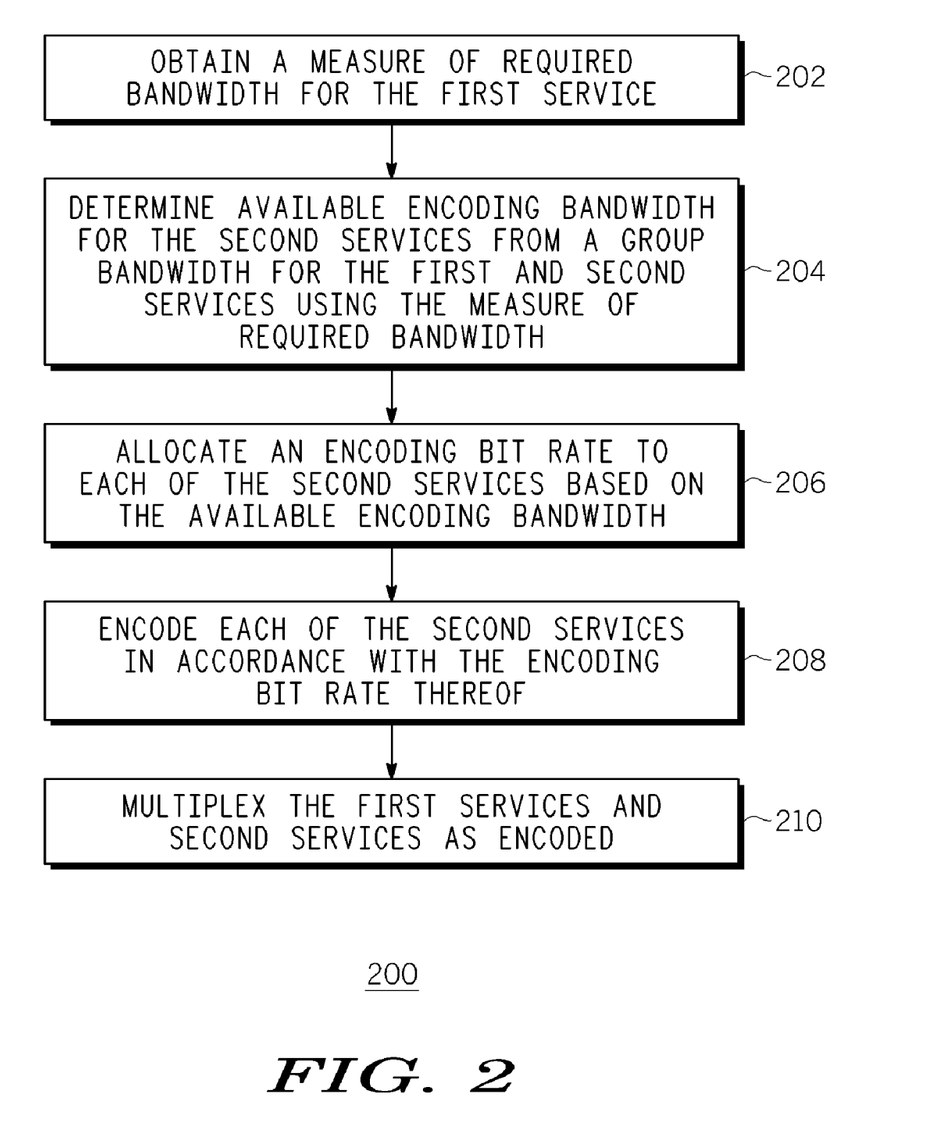
FIG. 2 is a flow diagram depicting an exemplary embodiment of a method for statistically multiplexing first and second services in a group in accordance with one or more aspects of the invention.

FIG. 2 is a flow diagram depicting an exemplary embodiment of a method 200 for statistically multiplexing first and second services in a group in accordance with one or more aspects of the invention. At step 202, a measure of required bandwidth for the first services is obtained. The first services may comprise pre-encoded services. At step 204, an available encoding bandwidth for the second services is determined from a group bandwidth for the first and second services using the measure of required bandwidth. At step 206, an encoding bit rate is allocated to each of the second services based on the available encoding bandwidth. At step 208, each of the second services is encoded in accordance with the encoding bit rate thereof. At step 210, the first services and the second services as encoded are multiplexed.

Figure 3:
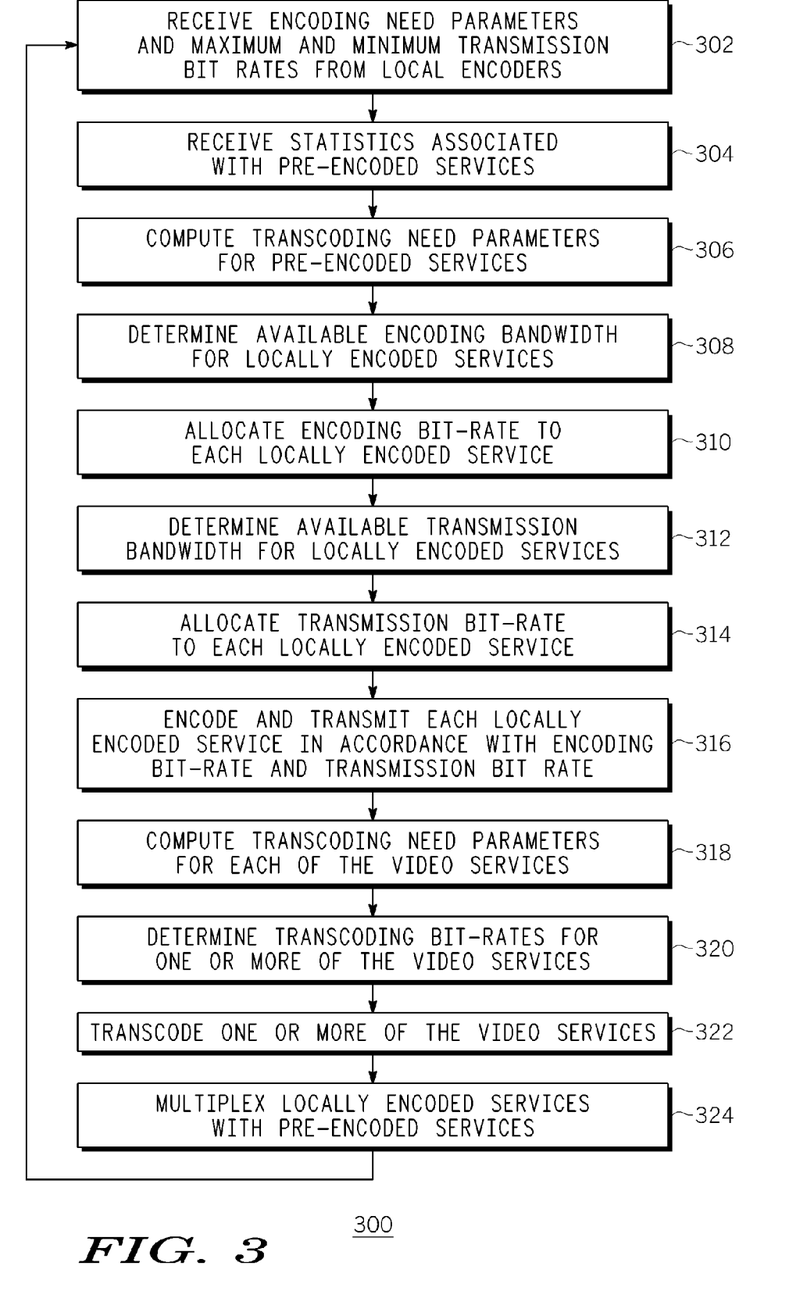
FIG. 3 is a flow diagram depicting an exemplary embodiment of a method for statistically multiplexing locally encoded services with pre-encoded services in accordance with one or more aspects of the invention.

FIG. 3 is a flow diagram depicting an exemplary embodiment of a method 300 for statistically multiplexing locally encoded services with pre-encoded services in accordance with one or more aspects of the invention. The method 300 begins at step 302, where encoding need parameters and maximum and minimum transmission bit rates are received from local encoders. At step 304, statistics associated with the pre-encoded services are received. The statistics include minimum bit-rates for the pre-encoded services. At step 306, transcoding need parameters are computed for the pre-encoded services. The transcoding need parameters are a measure of required bandwidth for the pre-encoded services.

At step 308, an available encoding bandwidth for the locally encoded services is determined. In one embodiment, the measure of required bandwidth for the pre-encoded services comprises a sum of weighted transcoding need parameters. The available encoding bandwidth is determined using a function of the sum of weighted transcoding need parameters, the group bandwidth, a sum of weighted encoding need parameters for the locally encoded services, a sum of minimum bit rates for the locally encoded services, and a maximum encoding bandwidth. The maximum encoding bandwidth is the group bandwidth less the sum of minimum bit rates of the pre-encoded services. In one embodiment, the function is defined as in Equation 1 above.

At step 310, an encoding bit rate is allocated to each of the locally encoded services based on the available encoding bandwidth. In one embodiment, each of the locally encoded services is provided bandwidth from the available encoding bandwidth proportional to the weighted encoding need parameter associated therewith, subject to the maximum and minimum transmission bit rate constraints.

At step 312, the available transmission bandwidth is determined for the locally encoded services. In one embodiment, the available encoding bandwidth is delay by a pre-defined amount (e.g., 0.5 seconds). The available transmission bandwidth may be computed using a function of the available encoding bandwidth as delayed, a sum of minimum transmission bit-rates for the locally encoded services, a sum of maximum transmission bit rates for the locally encoded services, and a maximum transmission bandwidth. The maximum transmission bandwidth is the group bandwidth less the sum of all user-defined minimum bit-rates for the pre-encoded services. In one embodiment, the function is defined as in Equation 2 above.

At step 314, a transmission bit rate is assigned to each of the locally encoded services based on the available transmission bandwidth. In one embodiment, each of the locally encoded services is provided bandwidth from the available transmission bandwidth proportional to its delayed encoding bit rate, subject to the maximum and minimum transmission bit rate constraints.

At step 316, each of the locally encoded services is encoded in accordance with its encoding bit-rate and transmitted in accordance with its transmission bit-rate. At step 318, transcoding need parameters are computed for each of the locally encoded services and each of the pre-encoded services. At step 320, transcoding bit rates are determined for one or more of the locally encoded services and the pre-encoded services using the transcoding need parameters. At step 322, one or more of the locally encoded services and the pre-encoded services are transcoded in accordance with the transcoding bit rates. At step 324, the locally encoded services and the pre-encoded services are multiplexed. The method 300 is then repeated.

Figure 5:
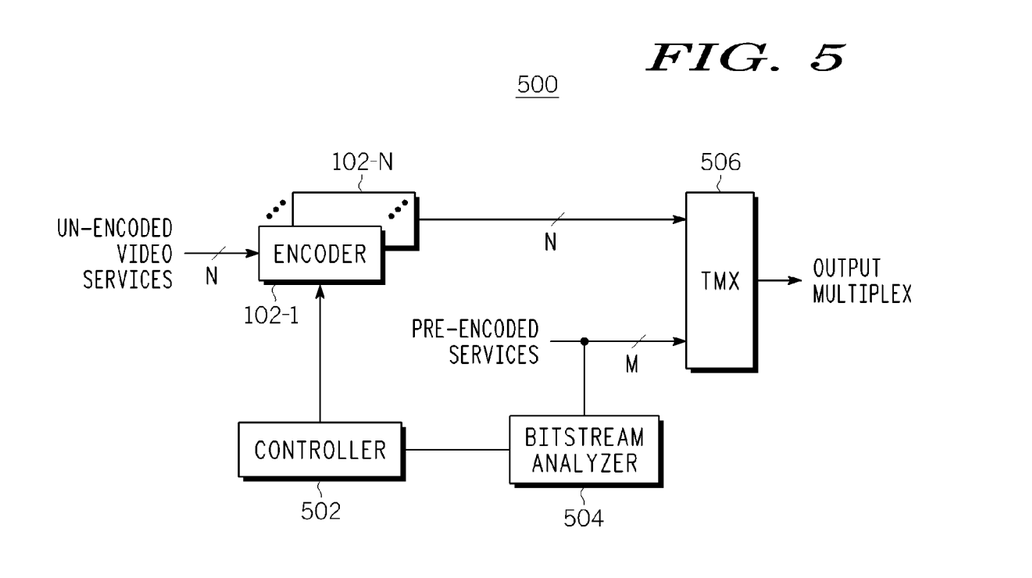
FIG. 5 is a block diagram depicting another exemplary embodiment of a video processing system in accordance with one or more aspects of the invention.

FIG. 5 is a block diagram depicting another exemplary embodiment of a video processing system 500 in accordance with one or more aspects of the invention. Elements of FIG. 5 that are the same or similar to those of FIG. 1 are designated with identical reference numerals and are described in detail above. The video processing system 500 includes the encoders 102, a controller 502, a bitstream analyzer 504, and a TMX 506. The TMX 506 may comprise a generic transport stream multiplexer having transcoders (not shown) for transcoding input video streams. The TMX 506 is configured to receive the locally encoded streams from the encoders 102, and the pre-encoded streams.

The bitstream analyzer 504 is also configured to receive the pre-encoded streams. The bitstream analyzer 504 is configured to analyze each of the pre-encoded video streams and derive statistics therefrom. The controller 502 periodically generates an interrupt every Tq seconds. At every interrupt, the bitstream analyzer 504 sends the statistics of the pre-encoded video streams to the controller 110. Exemplary statistics are described above. The controller 110 computes transcoding need parameters from the statistics for the pre-encoded video streams. Transcoding need parameters may be computed as described above.

The controller 502 is further coupled to each of the encoders 102. At every interrupt, the encoders 102 send encoding need parameters and minimum and maximum transmission bit rates to the controller 110. Using the data received from the encoders 102 and the bitstream analyzer 504, the controller 502 performs a bandwidth allocation algorithm to allocate bandwidth among the locally encoded services. That is, the controller 502 sets aside a portion of the group bandwidth for all of the video streams to become available encoding bandwidth for the locally encoded services. The controller 502 may compute the available encoding bandwidth as described above in Equation 1. The available transmission bandwidth may be computed as described above in Equation 2. The controller 502 allocates the available encoding bandwidth and available transmission bandwidth among the encoders 102 and provides an encoding bit rate and transmission bit rate to each of the encoders. The encoding and transmission bandwidths may be allocated among the encoders 102 as described above.

The TMX 506 performs rate shaping on all input video services (the locally encoded services and the pre-encoded services) to form the output multiplex. Since the bit-rates of the locally encoded services are VBR and have already accounted for the bandwidth need of the pre-encoded services, the bit-rate reduction of the locally encoded services is minimized (e.g., transcoding by the TMX 506 is minimized for the locally encoded services).

Figure 6:
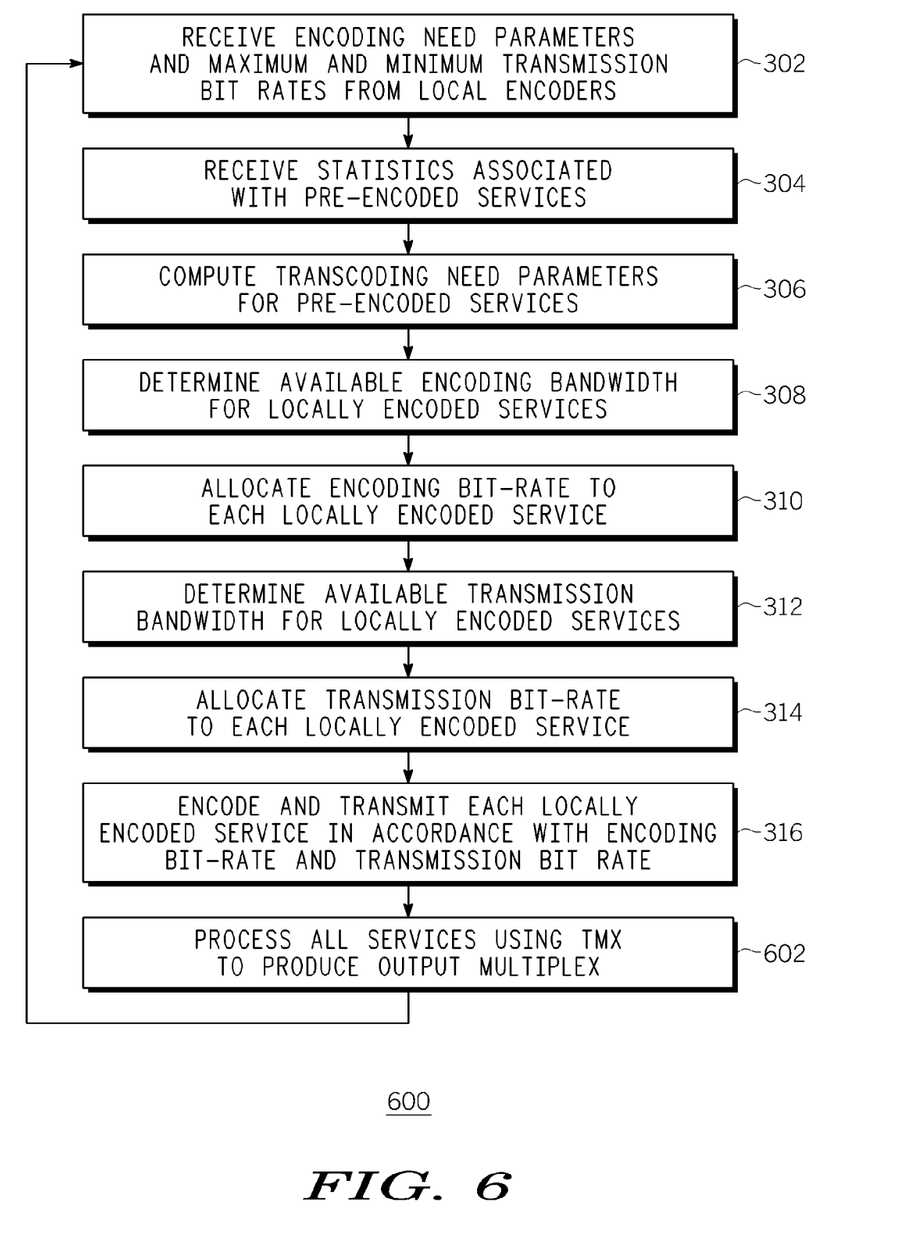
FIG. 6 is a flow diagram depicting another exemplary embodiment of a method 500 for statistically multiplexing locally encoded services with pre-encoded services in accordance with one or more aspects of the invention.

FIG. 6 is a flow diagram depicting another exemplary embodiment of a method 600 for statistically multiplexing locally encoded services with pre-encoded services in accordance with one or more aspects of the invention. Steps in the method 600 that are the same or similar to those of FIG. 3 are designated with identical reference numerals and described in detail above. The method 600 begins at step 302 and proceeds through step 316. The method 600 proceeds from step 316 to step 602, where the locally encoded services and the pre-encoded services are processed by a TMX to produce an output multiplex. The TMX may be a generic transport stream multiplexer having transcoders for maintaining a group bandwidth requirement for the output multiplex. The method 600 is then repeated.

Figure 4:
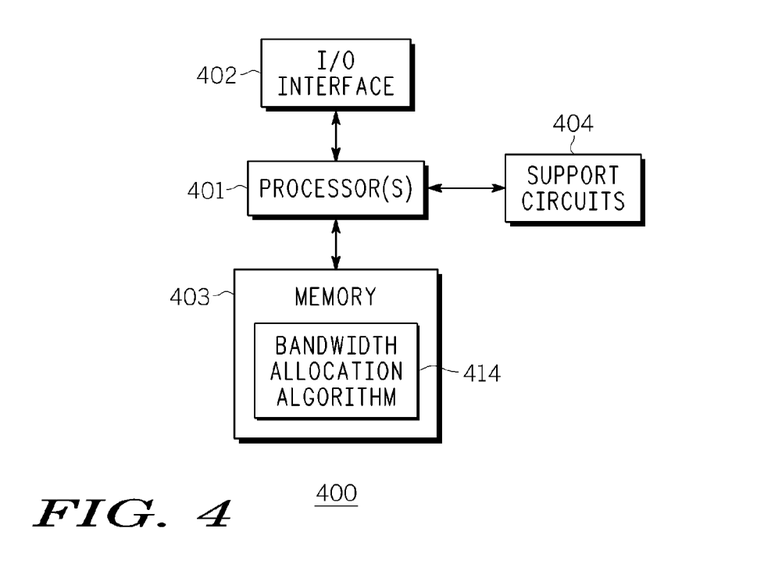
FIG. 4 is a block diagram depicting an exemplary embodiment of a controller in the video processing system of FIG. 1 constructed in accordance with one or more aspects of the invention.

FIG. 4 is a block diagram depicting an exemplary embodiment of a controller 400 constructed in accordance with one or more aspects of the invention. The controller 400 may be used to implement the controller 110 of FIG. 1 or the controller 502 of FIG. 5. The controller 400 includes one or more processors 401, a memory 403, various support circuits 404, and an I/O interface 402. The processor(s) 401 may be any type of microprocessor known in the art. The support circuits 404 for the processor(s) 401 include conventional cache, power supplies, clock circuits, data registers, I/O interfaces, and the like. The I/O interface 402 may be directly coupled to the memory 403 or coupled through the processor(s) 401. The I/O interface 402 may be coupled to the encoders, a bitstream analyzer, and/or various transcoders.

The memory 403 stores processor-executable instructions and/or data that may be executed by and/or used by the processor(s) 401. These processor-executable instructions may comprise hardware, firmware, software, and the like, or some combination thereof. Modules having processor-executable instructions that are stored in the memory 403 include bandwidth allocation algorithm 414. The bandwidth allocation algorithm 414 is configured to cause the controller 400 to operate as described above with respect to FIG. 1 or FIG. 5. The memory 403 may include one or more of the following random access memory, read only memory, magneto-resistive read/write memory, optical read/write memory, cache memory, magnetic read/write memory, and the like, as well as signal-bearing media as described below.

Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs. The controller 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

What is claimed is:

1. A method of statistically multiplexing first services and second services in a group, comprising:
   obtaining a measure of required bandwidth for the first services, the first services comprising pre-encoded services;
   determining an available encoding bandwidth for the second services from a group bandwidth for the first and second services using the measure of required bandwidth;
   allocating an encoding bit rate to each of the second services based on the available encoding bandwidth;
   encoding each of the second services in accordance with the encoding bit rate thereof; and
   multiplexing the first services with the second services as encoded,
   wherein the measure of required bandwidth comprises a sum of weighted transcoding need parameters for the first services, and wherein the available encoding bandwidth is determined using a function of the sum of weighted transcoding need parameters, the group bandwidth, a sum of weighted encoding need parameters for the second services, a sum of minimum bit rates for the second services, and a maximum encoding bandwidth.

2. The method of claim 1, wherein the function comprises:

$$\text{Maximum}\left\{\text{Minimum}\left\{GBW \times \frac{ENP}{ENP + f(TNP)}, MAXEBW\right\}, SEMIN\right\},$$

where GBW is the group bandwidth, ENP is the sum of weighted encoding need parameters, TNP is the sum of weighted transcoding need parameters, MAXEBW is the maximum encoding bandwidth, SEMIN is the sum of minimum bit rates, and f is a function for transforming TNP to match ENP.

3. The method of claim 1, wherein the step of allocating comprises:
   providing each of the second services bandwidth from the available encoding bandwidth proportional to the weighted encoding need parameter associated therewith.

4. A method of statistically multiplexing first services and second services in a group, comprising:
   obtaining a measure of required bandwidth for the first services, the first services comprising pre-encoded services;
   determining an available encoding bandwidth for the second services from a group bandwidth for the first and second services using the measure of required bandwidth;
   allocating an encoding bit rate to each of the second services based on the available encoding bandwidth;
   encoding each of the second services in accordance with the encoding bit rate thereof;
   multiplexing the first services with the second services as encoded;
   delaying the available encoding bandwidth;
   determining an available transmission bandwidth for the second services using the available encoding bandwidth as delayed; and
   allocating a transmission bit rate to each of the second services based on the available transmission bandwidth,
   wherein the available transmission bandwidth is determined using a function of the available encoding bandwidth as delayed, a sum of minimum transmission bit rates for the second services, a sum of maximum transmission rates for the second services, and a maximum transmission bandwidth.

5. The method of claim 4, wherein the function comprises:

$$\text{Minimum}\{\text{Maximum}\{DEBW, SMINTXR\}, SMAXTXR, MAXTBW\},$$

where DEBW is the available encoding bandwidth as delayed, SMINTXR is the sum of minimum transmission bit rates, SMAXTXR is the sum of maximum transmission rates, and MAXTBW is the maximum transmission bandwidth.

6. The method of claim 1, wherein the step of multiplexing comprises:
   determining transcoding need parameters for each of the first services and the second services;
   transcoding at least one service of the first services and the second services based on the transcoding need parameters.

7. Apparatus for statistically multiplexing first services and second services in a group, comprising:
   a processor configured to:
      obtain a measure of required bandwidth for the first services, the first services comprising pre-encoded services;
      determine an available encoding bandwidth for the second services from a group bandwidth for the first and second services using the measure of required bandwidth;
      allocate an encoding bit rate to each of the second services based on the available encoding bandwidth;
   a plurality of encoders, each of the plurality of encoders configured to encode one of the second services in accordance with the encoding bit rate thereof; and
   a multiplexer configured to multiplex the first services with the second services as encoded,
   wherein the measure of required bandwidth comprises a sum of weighted transcoding need parameters for the first services, and wherein the processor is configured to determine the available encoding bandwidth using a function of the sum of weighted transcoding need parameters, the group bandwidth, a sum of weighted encoding need parameters for the second services, a sum of minimum bit rates for the second services, and a maximum encoding bandwidth.

8. The apparatus of claim 7, wherein the function comprises:

$$\text{Maximum}\left\{\text{Minimum}\left\{GBW \times \frac{ENP}{ENP + f(TNP)}, MAXEBW\right\}, SEMIN\right\},$$

where GBW is the group bandwidth, ENP is the sum of weighted encoding need parameters, TNP is the sum of weighted transcoding need parameters, MAXEBW is the maximum encoding bandwidth, SEMIN is the sum of minimum bit rates, and f is a function for transforming TNP to match ENP.

9. An apparatus for statistically multiplexing first services and second services in a group, comprising:
a processor configured to:
obtain a measure of required bandwidth for the first services, the first services comprising pre-encoded services;
determine an available encoding bandwidth for the second services from a group bandwidth for the first and second services using the measure of required bandwidth;
allocate an encoding bit rate to each of the second services based on the available encoding bandwidth;
a plurality of encoders, each of the plurality of encoders configured to encode one of the second services in accordance with the encoding bit rate thereof; and
a multiplexer configured to multiplex the first services with the second services as encoded, wherein the processor is further configured to:
delay the available encoding bandwidth;
determine an available transmission bandwidth for the second services using the available encoding bandwidth as delayed; and
allocate a transmission bit rate to each of the second services based on the available transmission bandwidth,
wherein the processor determines the available transmission bandwidth using a function of the available encoding bandwidth as delayed, a sum of minimum transmission bit rates for the second services, a sum of maximum transmission rates for the second services, and a maximum transmission bandwidth.

10. The apparatus of claim 9, wherein the function comprises:

Minimum{Maximum{DEBW,SMINTXR},SMAXTXR,MAXTBW}, where DEBW is the available encoding bandwidth as delayed, SMINTXR is the sum of minimum transmission bit rates, SMAXTXR is the sum of maximum transmission rates, and MAXTBW is the maximum transmission bandwidth.

11. The apparatus of claim 7, wherein the processor is further configured to determine transcoding need parameters for each of the first services and the second services, and wherein the apparatus further comprises:
transcoders for transcoding at least one service of the first services and the second services based on the transcoding need parameters.

12. A computer readable non-transitory medium having stored thereon instructions that when executed by a processor cause the processor to perform a method of statistically multiplexing first services and second services in a group, comprising:
obtaining a measure of required bandwidth for the first services, the first services comprising pre-encoded services;
determining an available encoding bandwidth for the second services from a group bandwidth for the first and second services using the measure of required bandwidth;
allocating an encoding bit rate to each of the second services based on the available encoding bandwidth;
delaying the available encoding bandwidth;
determining an available transmission bandwidth for the second services using the available encoding bandwidth as delayed; and
allocating a transmission bit rate to each of the second services based on the available transmission bandwidth,
wherein the measure of required bandwidth comprises a sum of weighted transcoding need parameters for the first services, and wherein the available encoding bandwidth is determined using a function of the sum of weighted transcoding need parameters, the group bandwidth, a sum of weighted encoding need parameters for the second services, a sum of minimum bit rates for the second services, and a maximum encoding bandwidth.

13. The computer readable non-transitory medium of claim 12, wherein the function comprises:

$$\text{Maximum}\left\{\text{Minimum}\left\{GBW \times \frac{ENP}{ENP + f(TNP)}, MAXEBW\right\}, SEMIN\right\},$$

where GBW is the group bandwidth, ENP is the sum of weighted encoding need parameters, TNP is the sum of weighted transcoding need parameters, MAXEBW is the maximum encoding bandwidth, SEMIN is the sum of minimum bit rates, and f is a function for transforming TNP to match ENP.

14. The computer readable non-transitory medium of claim 12, wherein the available transmission bandwidth is determined using a function comprising:

Minimum{Maximum{DEBW,SMINTXR},SMAXTXR,MAXTBW}, where DEBW is the available encoding bandwidth as delayed, SMINTXR is the sum of minimum transmission bit rates, SMAXTXR is the sum of maximum transmission rates, and MAXTBW is the maximum transmission bandwidth.

15. The computer readable non-transitory medium of claim 12, further comprising:
determining transcoding need parameters for each of the first services and the second services.

* * * * *